United States Patent [19]

Lefeuvre

[11] 4,222,871
[45] Sep. 16, 1980

[54] IMPROVEMENTS IN THE SEPARATION OF LIQUID MIXTURES BY ULTRAFILTRATION

[75] Inventor: Antoine A. J. Lefeuvre, Ennery, France

[73] Assignee: Societe d'Etudes et de Realisations Industrielles - SERI, Bois-d'Arcy, France

[21] Appl. No.: 900,972

[22] Filed: Apr. 28, 1978

[30] Foreign Application Priority Data

May 5, 1977 [FR] France .................................. 77 13704

[51] Int. Cl.$^2$ .............................................. B01C 13/00
[52] U.S. Cl. .................................... 210/636; 210/640; 210/650; 210/259; 210/321 R; 210/409; 210/433 M
[58] Field of Search ............. 210/23 F, 259, 44, 23 H, 210/321 R, 433 M, 205, 209, 22, 409, 81

[56] References Cited

U.S. PATENT DOCUMENTS

| 68,157 | 8/1867 | Bender | 210/209 |
| 931,457 | 8/1909 | Murlock | 210/209 |
| 2,746,605 | 5/1956 | Baum | 210/205 X |
| 3,225,876 | 1/1966 | Mahon | 210/22 |
| 3,705,100 | 12/1972 | Blatt et al. | 210/23 F |
| 3,794,169 | 2/1974 | Sisk et al. | 210/411 X |
| 3,917,526 | 11/1975 | Jennings | 210/321 R X |
| 3,992,301 | 11/1976 | Shippey et al. | 210/23 H |

FOREIGN PATENT DOCUMENTS 2306942  5/1976  France ................................. 210/23 H Primary Examiner—Frank A. Spear, Jr.
Attorney, Agent, or Firm—Wigman & Cohen

[57] ABSTRACT

A method and device for separating liquid mixtures by ultrafiltration wherein prior to introducing the mixture into the ultrafilter a gas is added to the said mixture. The addition occurs at a pressure higher than the ultrafiltration pressure and the mixture of liquid and gas is allowed to expand down to the said ultrafiltration pressure prior to be introduced into the ultrafilter.

4 Claims, 1 Drawing Figure

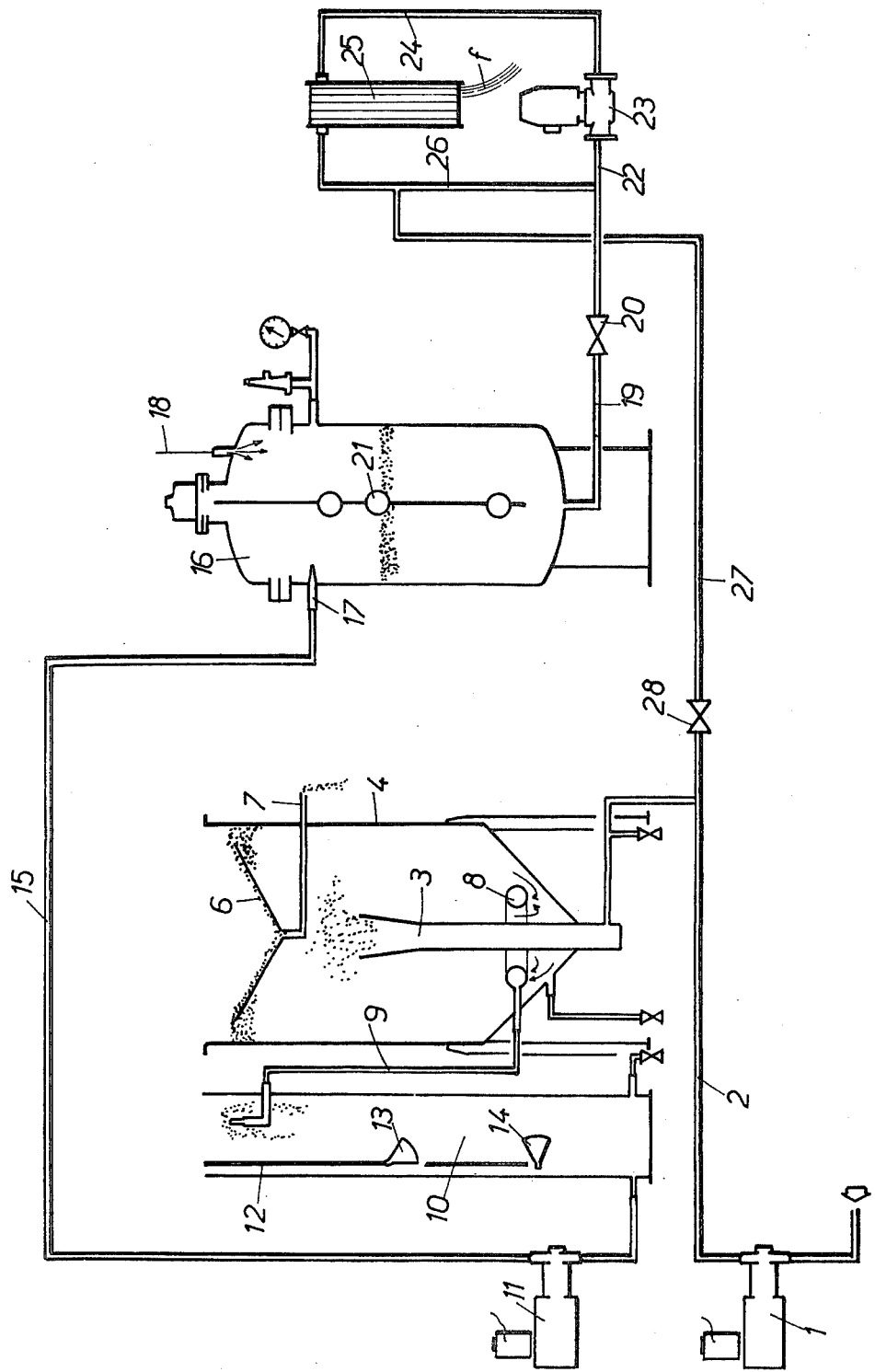

IMPROVEMENTS IN THE SEPARATION OF LIQUID MIXTURES BY ULTRAFILTRATION

The present invention refers to the separation of mixtures in the liquid state by putting the said mixtures under pressure in contact with a wall such as a membrane the permeability of which is such that only one or a number of the constituents of the mixture can pass through. This method is called "ultrafiltration".

It is in general applied to the separation of substances of relatively high molecular weight such as proteins, gums, polymers or complicated organic compounds, or else emulsions or colloidal dispersions in liquids such as water.

The portion of the mixture which passes through the membrane is called the "filtrate"; in the case of an aqueous mixture it consists essentially of the water containing in solution mineral products if necessary. The residue is called the "concentrate".

It is rare for the effect of separation or concentration obtained after one pass of the mixture through the ultrafilter to be sufficient, so the concentrate is recycled through the ultrafilter; the output of the latter, however, falls rapidly as the concentration increases because little by little the membrane gets clogged.

Hence one is led to cleaning or regenerating the membrane periodically and often to employing conjointly with the ultrafilter another type of separator in order to isolate the substances which cannot be isolated by the ultrafilter, for example, a floatation separator.

The object of the present invention is essentially to improve this species of separation and especially to see to it that the clogging of the ultrafilter is less rapid, the combination of the ultrafilter with a subsequent separator being equally favoured.

In accordance with the invention, before letting the mixture pass through the ultrafilter a gas such as air is dissolved in the said mixture at a pressure higher than that at which the ultrafiltration will be carried out.

The operation of ultrafiltration is then accompanied by expansion which causes the release of bubbles into the mixture and these bubbles, far from obstructing the pores in the membrane as one might have thought, prevent it from getting clogged by ensuring in particular a sort of self-cleaning which increases the output of the operation.

When the ultrafiltration is combined with an operation of separation by floatation the concentrate leaving the ultrafilter is made to undergo a second expansion before letting it pass through the separator or floatator, which dispenses with feeding the latter with compressed air.

In addition it is preferable to let the mixture to be processed pass first of all through the floatator, which enables the latter to play the part of a prior separator in which the mixture undergoes a first deconcentration and cleaning favourable to the operation of the ultrafilter.

The invention may receive all of the application of ultrafiltration, the gases chosen for putting it into effect may be different depending upon the particular case (air, nitrogen, carbon dioxide, etc.).

The description which is to follow with respect to the drawing attached, being given by way of non-restrictive example, will let it be well understood how the invention may be realized, the special features which become apparent both from the drawing and from the text forming of course part of the said invention.

The FIGURE is a diagrammatic view of an equipment in accordance with the invention.

In the example illustrated in the drawing the mixture to be processed, for example, a mixture of water and oil, is delivered by a pump 1 into pipework 2 connected to the central nozzle 3 of a separator by floatation or floatator 4.

The oil which floats on the surface in the floatator is collected in a central funnel 6 and exhausted through piping 7.

The aqueous phase still contaminated with oil, which is in the floatator, escapes through a bottom collector 8 and rising pipework 9, which plays the part of level-regulator, into a receiver 10 at the side, where it is picked up by a pump 11 subjected to a level-controller 12. The latter may include two floats, the upper one 13 which ensures the starting of the pump when the liquid reaches it, and the other 14 which stops the pumping when the level of the liquid has dropped sufficiently.

The pump 11 delivers the liquid through a pipe 15 into a pressurizer 16 where the said liquid enters through an upper nozzle 17. The pressurizer is otherwise fed, likewise at its upper part, through a pipe 18 with compressed air at, for example, the pressure of five bars.

In the pressurizer the air is dissolved in the liquid mixture and the solution leaves through a bottom pipe 19 which ends in an expansion valve 20. The pressurizer is equipped with a level-controller 21 which controls the outlet of the mixture charged with dissolved air.

The expansion valve 20 set, for example, at two bars feeds through a pipe 22 a circulating pump 23 the delivery pipe 24 of which is connected to an ultrafilter 25. The filtrate of water in the present example is exhausted by means not shown in the direction of the arrow f, whilst the concentrate is recycled into the pipe 22 by means of a pipe 26.

A tap-off 27 is inserted into the latter, and is connected to the inlet pipe 2 by means of an expansion valve 28.

Operation of the equipment which has just been described is as follows:

The floatator 4 receives the mixture to be processed, which it disencumbers of a portion of the oil in it, as well as the concentrate leaving the ultrafilter 25, expanded through the valve 28. This expansion causes in the nozzle 3 a release of bubbles of air which favours the separation of the oil a portion of which leaves through the funnel 6.

In the pressurizer 16 the air is dissolved into the mixture entering through the nozzle 17 and the pressure of compressed air, being substantially constant, ensures the feeding of the ultrafilter 25 at the pressure set by the expansion valve 20. The pump 23 ensures recycling by its relatively high flow.

The concentrate which leaves through the pipe 27 rejoins the bottom of the floatator after expansion through the valve 28.

Finally the oil is collected at the outlet 7 from the floatator 4 and the water is collected at the outlet from the ultrafilter 25.

In the equipment the liquid undergoes two successive expansions: one through the valve 20 upstream of the ultrafilter and the other through the valve 28 downstream of the said ultrafilter.

The expansion which occurs upstream of the ultrafilter causes in the heart of the liquid a release of bubbles which ensures without doubt by turbulence a cleaning of the membranes, which increases the service life and output of the latter.

The other expansion which occurs upstream of the floatator dispenses with feeding the latter with compressed air.

The introduction of the mixture to be separated might be effected first of all into the ultrafilter. However, by introducing the mixture firstly into the floatator it is made to play the part of pre-separator, certain of the oily particles then becoming separated from the mixture directly by floatation as well as light impurities. Hence the mixture subjected to ultrafiltration has already undergone a certain deconcentration or deoiling, which is more favourable to the operation of the ultrafilter.

One particularly interesting application of the method and of the equipment of the invention is the processing of stable water-oil emulsions, for example, cutting liquids, called "soluble oils", employed for mechanical machining: In this case, the ultrafiltration having the effect of "destabilizing" the emulsion, the concentrate leaving the ultrafilter is more effectively separated by floatation.

It goes without saying that the embodiment described is only one example and that it would be possible to modify it, especially by substitution of equivalent techniques, without thereby departing from the scope of the invention.

I claim:

1. A method for separating liquid mixtures including at least one liquid of relatively high molecular weight, comprising the steps of:
    (a) adding continuously a gas to the liquid mixtures at a high pressure;
    (b) expanding the gas in the liquid mixtures down to a lower pressure suitable for ultrafiltration of the liquid mixtures;
    (c) introducing subsequently the combined gas and liquid mixtures at the lower pressure into an ultrafilter having membranes inside for ultrafiltration; and
    (d) cleaning the membranes inside the ultrafilter by turbulence caused by a release of bubbles of the gas in the liquid mixtures, said release occurring due to the expanding upstream of said gas in the liquid mixtures.

2. The method according to claim 1 wherein a concentrate from the ultrafiltration is sent to a floatation separator, said concentrate being subjected to a further expansion prior to its introduction into said separator.

3. The method according to claim 2 wherein the liquid mixtures are first sent to said flotation separator, said gas being added to the liquid mixtures issuing from said separator and being sent to said ultrafilter.

4. The method according to claim 1 wherein the liquid mixtures are stable water-oil emulsions.

* * * * *